United States Patent [19]

Hiramoto

[11] Patent Number: 4,698,828

[45] Date of Patent: Oct. 6, 1987

[54] POSITION AND DIRECTION OF MOTION SENSING SYSTEM

[75] Inventor: Yukio Hiramoto, Yokohama, Japan

[73] Assignee: Nissan Motor Co., Ltd., Yokohama, Japan

[21] Appl. No.: 833,022

[22] Filed: Feb. 26, 1986

[30] Foreign Application Priority Data

Feb. 28, 1985 [JP]  Japan .................................. 60-37646

[51] Int. Cl.$^4$ ............................................. G06M 3/00
[52] U.S. Cl. .......................................... 377/3; 377/17;
    377/45; 377/53; 377/111; 250/231 SE
[58] Field of Search ..................... 377/17, 38, 87, 45,
    377/53, 55, 111, 3; 250/231 SE; 358/105

[56] References Cited

U.S. PATENT DOCUMENTS

| | | | |
|---|---|---|---|
| 3,092,718 | 6/1963 | Wullert | 377/17 |
| 3,122,735 | 2/1964 | Townsend | 377/53 X |
| 3,713,139 | 1/1973 | Sanford et al. | 377/17 |
| 3,729,621 | 4/1973 | Taisne | 377/3 |
| 3,793,508 | 2/1974 | Maggi | 377/53 X |
| 3,982,107 | 9/1976 | Butler | 377/55 X |
| 4,106,012 | 8/1978 | Knight | 377/17 |
| 4,152,579 | 5/1979 | Feinland | 377/3 |
| 4,215,337 | 7/1980 | Blanchard | 377/3 X |
| 4,308,500 | 12/1981 | Avins | 250/231 SE |
| 4,379,221 | 4/1983 | Avins et al. | 250/231 SE |
| 4,470,108 | 9/1984 | Kato et al. | 377/17 |
| 4,608,705 | 8/1986 | Tanaka | 377/53 X |
| 4,649,267 | 3/1987 | Ray | 250/231 SE X |

FOREIGN PATENT DOCUMENTS 57-149914  9/1982  Japan .

Primary Examiner—STanley D. Miller
Assistant Examiner—Karl Ohralik
Attorney, Agent, or Firm—Schwartz, Jeffery, Schwaab, Mack, Blumenthal & Evans

[57] ABSTRACT

A system for sensing the position of an object such as a rotating member has a plurality of photocouplers coupled with the interposition of a rotary disc having slits and rotating with the object. The system further has a position signal generating circuit for receiving signals produced by the photocouplers and producing a series of component position signals differing in phase successively by a predetermined phase difference, a counting circuit having an up/down count for determining the position of the object by counting occurrences of a predetermined change recurring periodically in the component position signals, and a direction determining circuit for producing an up/down signal for controlling the counting mode of the up/down counter. Each time the predetermined change occurs in any one of the component position signal, the direction determining circuit determines the order in which the change occurs in two successive component position signals.

14 Claims, 9 Drawing Figures

POSITION AND DIRECTION OF MOTION SENSING SYSTEM

BACKGROUND OF THE INVENTION

The present invention relates to a system for sensing the position of an object movable rotationally, rectilinearly or in some other way, by producing and processing one or more signals varying in accordance with displacement of the object.

Japanese Patent provisional publication No. 57-149914 discloses one conventional example of such a position sensing system using a so-called incremental rotary encoder (as shown in FIGS. 6 and 7). However, this system is not accurate especially when the direction of movement of the object alternates frequently between forward and backward directions or between clockwise and counterclockwise directions.

SUMMARY OF THE INVENTION

It is an object of the present invention to provide a position sensing system which is always accurate regardless of change in moving direction of the object.

According to the present invention, the position sensing system comprises a position signal generating means, a counting means and a direction determining means.

The position signal generating means produces a series of component position signals (SD1 to SD5 or SE1 to SE5) each of which varies periodically in accordance with displacement of an object in such a manner that the component position signals differ in phase successively by a predetermined phase difference in a predetermined forward sequence of the component position signals when the object moves in a forward direction, and in a reverse sequence opposite to the forward sequence when the object moves in a reverse direction opposite to the forward direction.

The counting means determines the position of the object by counting occurrences of a predetermined change which recurs periodically in each of the component position signals. The counting means has a positive counting mode for increasing a count by a predetermined amount, usually equal to one, for each occurrence of the predetermined change and a negative counting mode for decreasing the count by the predetermined amount for each occurrence of the change.

Each time the change occurs in one of the component position signal, the direction determining means determines the component position signal in which the change occurs immediately before the current occurrence, to determine whether the change occurs in the forward sequence or in the reverse sequence. The direction determining means switches the counting means between the positive and negative counting modes in dependence on the result of the determination of the sequence.

DETAILED DESCRIPTION OF THE INVENTION

Figure 6:
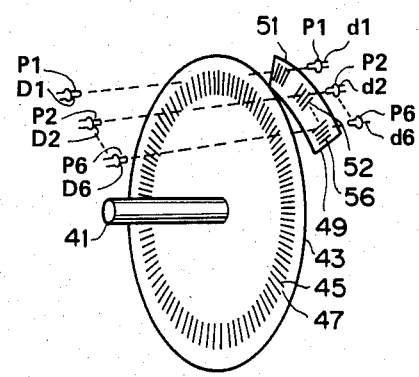
FIG. 6 is a schematic perspective view of an incremental rotary encoder.
Figure 7:
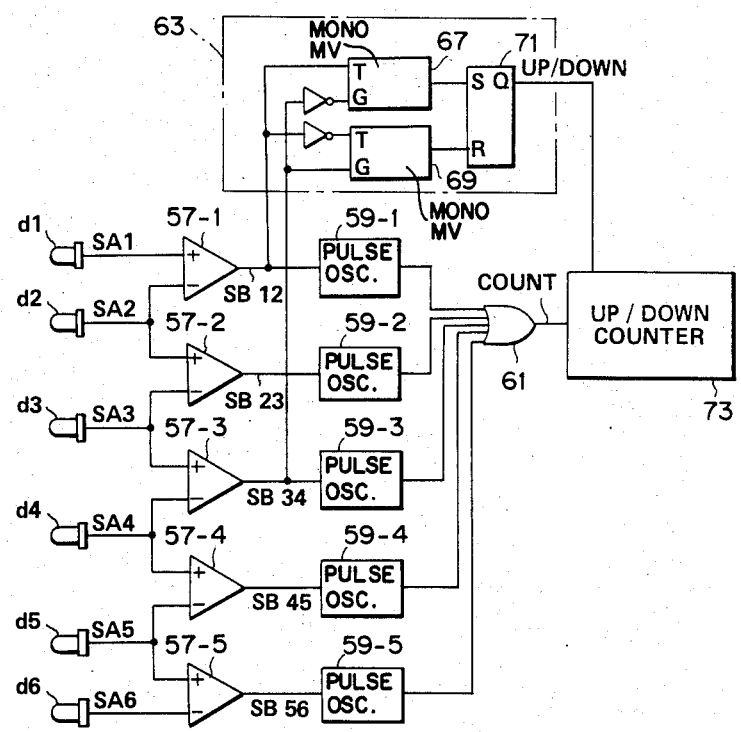
FIG. 7 is a diagram showing a conventional position sensing system.
Figure 8:
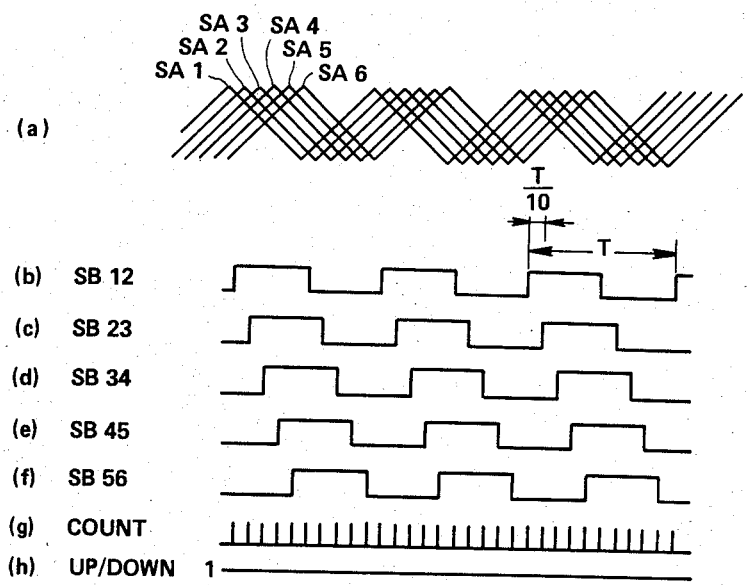
FIG. 8 is a waveform chart of signals appearing in the system of FIG. 7.

FIGS. 6 and 7 shows a conventional position sensing system having at least one photocoupler P1 consisting of a light-emitting diode D1 and a photodiode d1. A rotary slit disc 43 and a stationary slit plate 49 are placed between the light-emitting diode D1 and the photodiode d1. The rotary slit disc 43 has a pattern of open portions 45 permitting passage of light and closed portions preventing passage of light, which are alternately arranged at regular intervals in a circle concentric with a shaft 41 of the rotary disc 43. The stationary slit plate 49 has a pattern 51 whose pitch is equal to the pitch of the rotary disc 43. The rotary disc 43 is adapted to rotate in synchronism with movement of an object whose position is to be sensed. A light beam directed from the light-emitting diode D1 to the photodiode d1 is interrupted repeatedly so that the number of times of interruption corresponds to the amount of displacement of the object. This system determines the position of the object by counting cycles of an output signal produced by the photodiode d1. In order to improve the resolution, this system utilizes a plurality of photocouplers P1, P2, . . . and P6. In this example, the number of the photocouplers is six. The stationary slit plate 49 is formed with a plurality of the patterns (six patterns 51, 52, . . . and 56). The six photodiodes d1, d2, . . . and d6 of the six photocouplers P1, P2, . . . and P6 produce six pickup signals SA1, SA2, . . . and SA6 differing in phase by 36 degrees, as shown at (a) in FIG. 8.

The six pickup signals are inputted to a processing circuit shown in FIG. 7, which is arranged to detect each crossing between each succesive pair of the pickup signals whose phases are adjacent to each other, and to count the crossings of all the succesive pairs. The processing circuit has five comparators 57-1, 57-2, . . . and 57-5. Each of the comparators receives uniquely one of the five succesive pairs of the pickup signals. That is, two of the pickup signals assigned to each comparator are adjacent to each other in a phase sequence. For example, the first comparator 57-1 compares the first and second pickup signals SA1 and SA2 with each other, and the second comparator 57-2 compares the second and third pickup signals SA2 and SA3 with each other. The comparators 57-1 to 57-5 produce five comparator pulse signals SB12, SB23, . . . and SB56 differing in phase by 36 degrees as shown at (b) to (f) in FIG. 8. The comparator pulse signals SB12 to SB56 are inputted to edge-trigger pulse oscillators 59-1, 59-2, . . . and 59-5, respectively. Each of the edge-trigger pulse oscillators produces a pulse for of leading and trailing edges of the input signal. An OR gate 61 produces a COUNT signal shown at (g) in FIG. 8 by performing a logical addition of outputs of the five edge-trigger pulse oscillators 59-1 to 59-5. The COUNT signal is inputted to an up/down counter 73.

This position sensing system further has a direction determining circuit 63 which determines the rotational direction of the rotary disc 43 by checking the order in which a rise occurs in two signals arbitrarily selected out of the comparator signals SB12 to SB56. The direction determining circuit 63 has two gated monostable multivibrators 67 and 69. In this example, the signal SB12 and the signal $\overline{SB\text{-}34}$ are inputted to the gated monostable multivibrator 67. The signal $\overline{SB12}$ and the signal SB34 are inputted to the gated monostable multivibrator 69. A flip-flop 71 is set and reset by the outputs of monostable vibrators 67 and 69 for producing an UP/DOWN signal (shown at (h) in FIG. 8) corresponding to the rotational direction of the rotary disc 43. The UP/DOWN signal is inputted to a control terminal of an up/down counter 73 to switch the direction of the counting mode.

Figure 9:
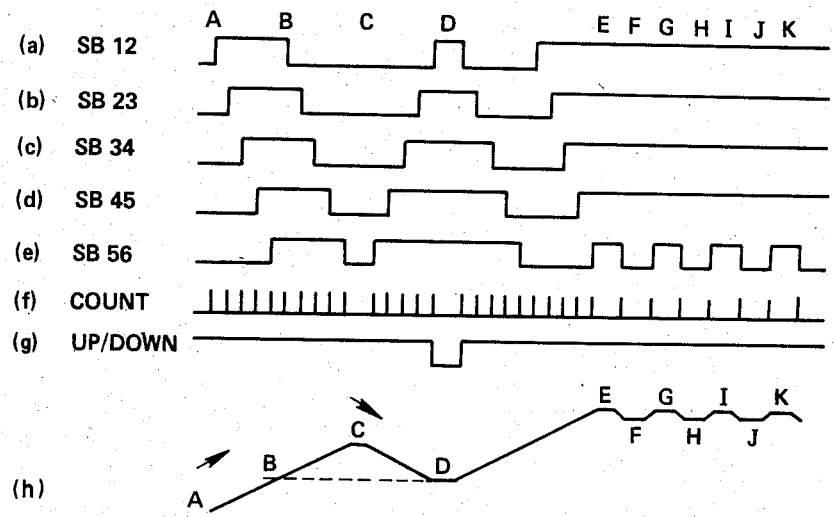
FIG. 9 is a waveform chart similar to FIG. 8 but showing waveforms obtained when the direction of movement of an object is changed.

FIG. 9 shows waveforms of the signals SB12 to SB56 (cf. (a) to (e)), and waveforms of the COUNT signal (f) and the UP/DOWN signal (g) obtained by this system when the rotational direction of the rotary disc 43 changes between clockwise and counterclockwise directions as shown at (h). The rotary disc 43 rotates in the clockwise direction during the interval between points A and C, and in the counterclockwise direction during the interval between points C and D. In this system, a change in rotational direction of the rotary disc 43 at the point C does not cause a responsive change in the UP/DOWN signal immediately, so that this system increases the count of the up/down counter 73 by nine during the interval between the points B and D whereas the initial and final positions of the object are coincident with each other. When the rotational direction changes in an oscillatory manner from a point E through points F, G, H, I and J to a point K, the UP/DOWN signal of this system remains unchanged, and the up/down counter 73 continues increasing its count. In this conventional position sensing system, the time cycle of detection of the rotational direction is longer than the period of the COUNT signal. Therefore, the UP/DOWN signal cannot respond correctly to changes in the rotational direction, and the counter cannot provide a correct count corresponding to the position of the object.

Figure 1:
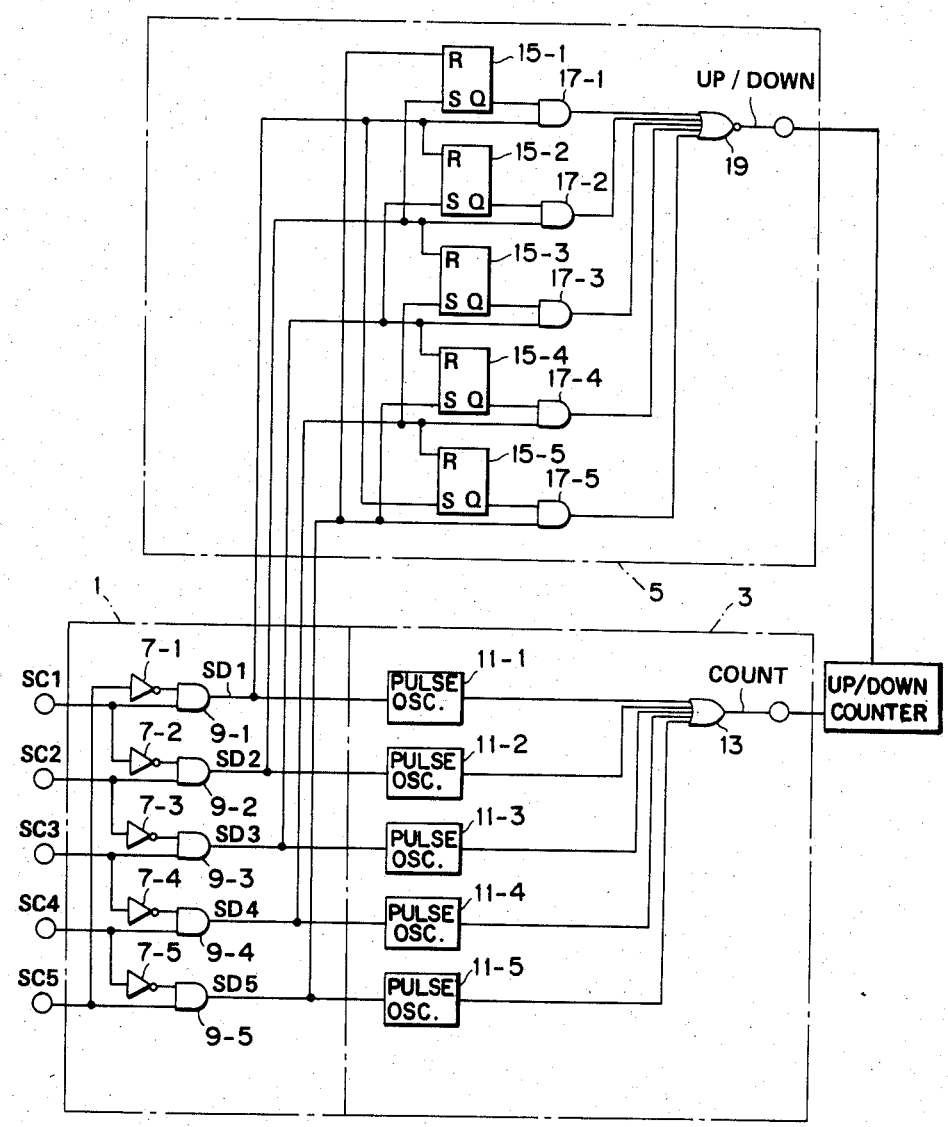
FIG. 1 is a diagram of a first embodiment of the present invention.

A first embodiment of the present invention is shown in FIG. 1. A position sensing system of the first embodiment comprises a minute position sensing circuit 1, a count signal generating circuit 3, and a direction determining circuit 5. The minute position sensing circuit 1 receives five signals SC1 to SC5 which differ in phase with respect to one another, and produces five component position signals SD1 to SD5. The count signal generating circuit 3 receives the five component position signals SD1 to SD5 and produces a COUNT signal. The direction determining circuit 5 receives the five component position signals SD1 to SD5. Each time a predetermined change occurs in one of the signals SD1 to SD5, the direction determining circuit 5 checks which one of the signals SD1 to SD5 has undergone the predetermined change immediately before the current occurrence of the predetermined change. In dependence on the result of the check, the direction determining circuit 5 produces an UP/DOWN signal to control the direction of a counting mode.

The minute position sensing circuit 1 has five NOT gates 7-1 to 7-5, and five AND gates 9-1 to 9-5. The five NOT gates 7-1 to 7-5 invert the five signals SC5, SC1, SC2, SC3 and SC4, respectively. Each of the AND gates 9-1 to 9-5 has two input terminals and receives a unique neighboring pair of the signals SC1 to SC5, adjacent to each other in the phase sequence, one of which is inputted directly and the other of which is inputted through a corresponding one of the NOT gates 7-1 to 7-5. The AND gates 9-1 to 9-5 perform each a logical multiplication between the two input signals, and provide the component position signals SD1 to SD5, respectively.

The count signal generating circuit 3 has five positive-edge trigger pulse oscillators 11-1 to 11-5, and a five-input OR gate 13. The pulse oscillators 11-1 to 11-5 receive the component position signals SD1 to SD5, respectively. Each of the pulse oscillators 11-1 to 11-5 extracts each rise of the input signal in the form of a pulse. The OR gate 13 performs a logical addition of the pulse outputs of the pulse oscillators 11-1 to 11-5, and produces the COUNT signal.

The direction determining circuit 5 has five RS flip-flops 15-1 to 15-5, five AND gates 17-1 to 17-5, and a five-input NOR gate 19. The component position signals SD5, SD1, SD2, SD3 and SD4 are inputted to the R input terminals of the RS flip-flops 15-1, 15-2, 15-3, 15-4 and 15-5, respectively. The component position signals SD2, SD3, SD4, SD5 and SD1 are inputted to the S input terminals of the RS flip-flops 15-1, 15-2, 15-3, 15-4 and 15-5, respectively. That is, each of the RS flip-flops 15-1 to 15-5 receives two of the component position signals which lie immediately before and after the corresponding component position signal in the phase sequence. For example, the first RS flip-flop 15-1 receives the signals SD5 and SD2 between which the first signal SD1 corresponding to the first flip-flop 15-1 is positioned. Each of the AND gates 17-1 to 17-5 receives the output signal of the corresponding RS flip-flop and the corresponding component position signal, and determines a logical product between the two inputs. For example, the first AND gate 17-1 receives the output of the first RS flip-flop 15-1 corresponding to the first AND gate 17-1 and the first component position signal SD1 corresponding to the first AND gate 17-1. The NOR gate 19 receives the outputs of the five AND gates 17-1 to 17-5 as inputs, and produces the UP/DOWN signal by inverting a logical sum of the five inputs.

Figure 2:
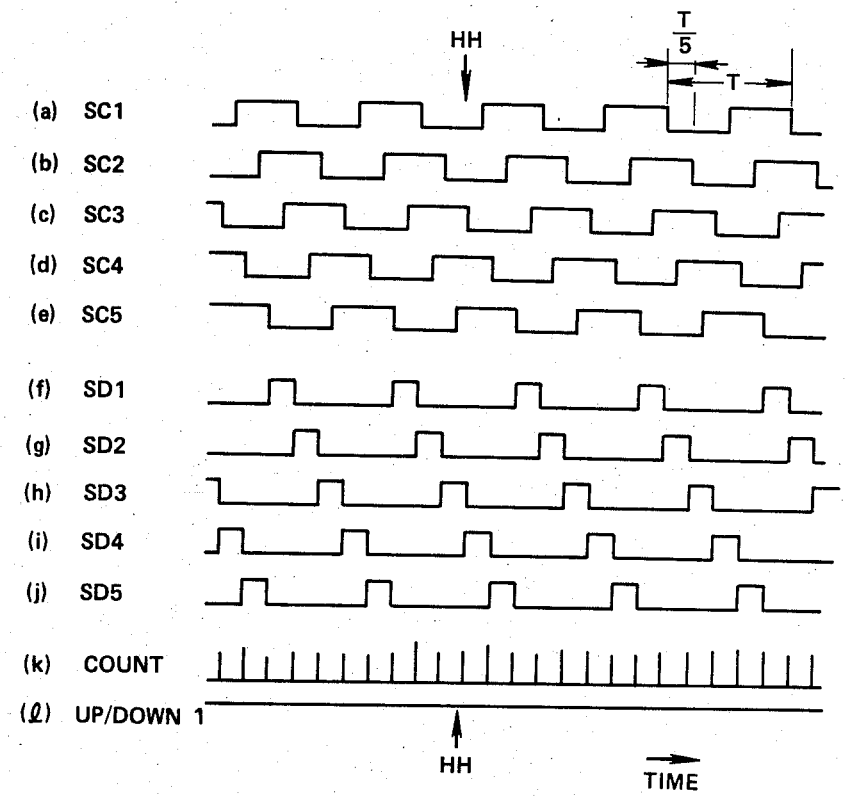
FIG. 2 is a waveform chart of signals appearing in the system of FIG. 1.

The position sensing system of the first embodiment is operated as follows:

FIG. 2 shows waveforms of the various signals appearing in the position sensing system of FIG. 1 when the rotary slit disc 43 shown in FIG. 6 is rotated in one direction only, in a clockwise direction, for example. The input signals SC1 to SC5, as shown at (a) to (e) in FIG. 2, have the same period T, and differ in phase by T/5 succesively.

The minute position sensing circuit 1 performs the following logical operations and produces the component position signals SD1 to SD5.

$$SD1 = \overline{SC5} \cdot SC1$$

$$SD2 = \overline{SC1} \cdot SC2$$

...

-continued $$SD5 = \overline{SC4} \cdot SC5$$

That is, the minute position sensing circuit 1 checks the five succesive pairs of the input signals SC1 to SC5. Each of the five succesive pairs consists of a preceeding input signal and a succeeding input signal following the preceding input signal in the sequence of the input signals SC1, SC2, SC3, SC4 and SC5. The minute position sensing circuit 1 selects the pair consisting of the preceding input signal equal to "0" and the succeeding input signal equal to "1", and makes the component position signal corresponding to the selected pair, equal to "1". By reason of the properties of the input signals SC1 to SC5, only one of the five component position signals SD1 to SD5 can be "1" at any given point of time. For example, at a time point HH in FIG. 2, the input signal SC2 is "0" as shown at (b), and the input signal SC3 is "1" as shown at (c). Therefore, the component position signals are; SD1=0, SD2=0, SD3=1, SD4=0 and SD5=0.

The component position signals SD1 to SD5 are inputted, respectively, to the pulse oscillators 11-1 to 11-5 of the count signal generating circuit 3. Each of the pulse oscillators 11-1 to 11-5 outputs a pulse each time its input signal rises from the low level to the high level. The OR gate 13 produces the COUNT signal (as shown a (k) in FIG. 2) by performing the logical addition of the outputs of all the pulse oscillators 11-1 to 11-5. In this way, the count signal generating circuit 3 produces a single pulse each time any one of the component position signal SD1 to SD5 changes from "0" to "1", and delivers the thus-produced pulse train as the COUNT signal.

In the direction determining circuit 5, three signals are selected out of the five component position signals SD1 to SD5, and inputted to one of the five combinational circuits each of which consists of one of the RS flip-flops 15-1 to 15-5 and one of the AND gates 17-1 to 17-5, in the following manner.

The S input of the ith flip-flop; the signal SDi+1
The R input of the ith flip-flop; the signal SDi−1
One input of the ith AND gate; the signal SDi
For Example, the following signals are inputted to the first combinational circuit of the first flip-flop 15-1 and the first AND gate 17-1.

The S input of the flip-flop; the signal SD2
The R input of the flip-flop; the signal SD5
One input of the AND gate; the signal SD1

The outputs of all the five combinational circuits are inputted to the NOR gate 19, which produces the UP/DOWN signal (as shown at (l) in FIG. 2) by performing the logical addition of the five inputs and inverting the result of the logical addition. In the third combinational circuit, for example, the component position signals SD2, SD4 and SD3 are applied, respectively, to the R input terminal of the flip-flop 15-3, the S input terminal of the flip-flop 15-3 and one of the two input terminals of the AND gate 17-3. The output of the third combinational circuit is "1" when the signal SD3 is "1" during the time interval between the instant at which the signal SD4 becomes "1" and accordingly the flip-flop 15-3 is set and the instant at which the signal SD2 becomes "1" and accordingly the flip-flop 15-3 is reset. That is, in this case, the component position signals SD1 to SD5 are changed to the "1" state one after another in the sequence of SD4, SD3, SD2 with the elapse of time. This means that the rotary slit disc 43 is rotating in the counterclockwise direction. During this, the UP/DOWN signal is held at the "0" state, and applied to a control terminal of an up/down counter for counting the number of pulses of the COUNT signal, such as the up/down counter 73 shown in FIG. 7. Therefore, the up/down counter is put in a down-count mode to decreasing the count by one for each pulse. Because the UP/DOWN signal is the result of the inversion of the logical sum of the outputs of the five combinational circuits, the UP/DOWN signal is "0" when any one of the outputs of the five combinational circuits is "1". When the above-mentioned condition is not satisfied, the output of the third combinational circuit is "0". Therefore, all the outputs of the five combinational circuits are "0" when the "1" state occurs in the component position signals SD1 to SD5 one after another in the sequence of SD2, SD3, SD4 with the elapse of time. That is, the rotary slit disc 43 is rotating in the clockwise direction. During this, the UP/DOWN signal remains "1", so that the up/down counter increases the count by one for each pulse of the COUNT signal. Since the rotary slit disc is rotating in the clockwise direction constantly in the case of FIG. 2, the UP/DOWN signal is always held at the "1" state as shown at (l) in FIG. 2.

Figure 3:
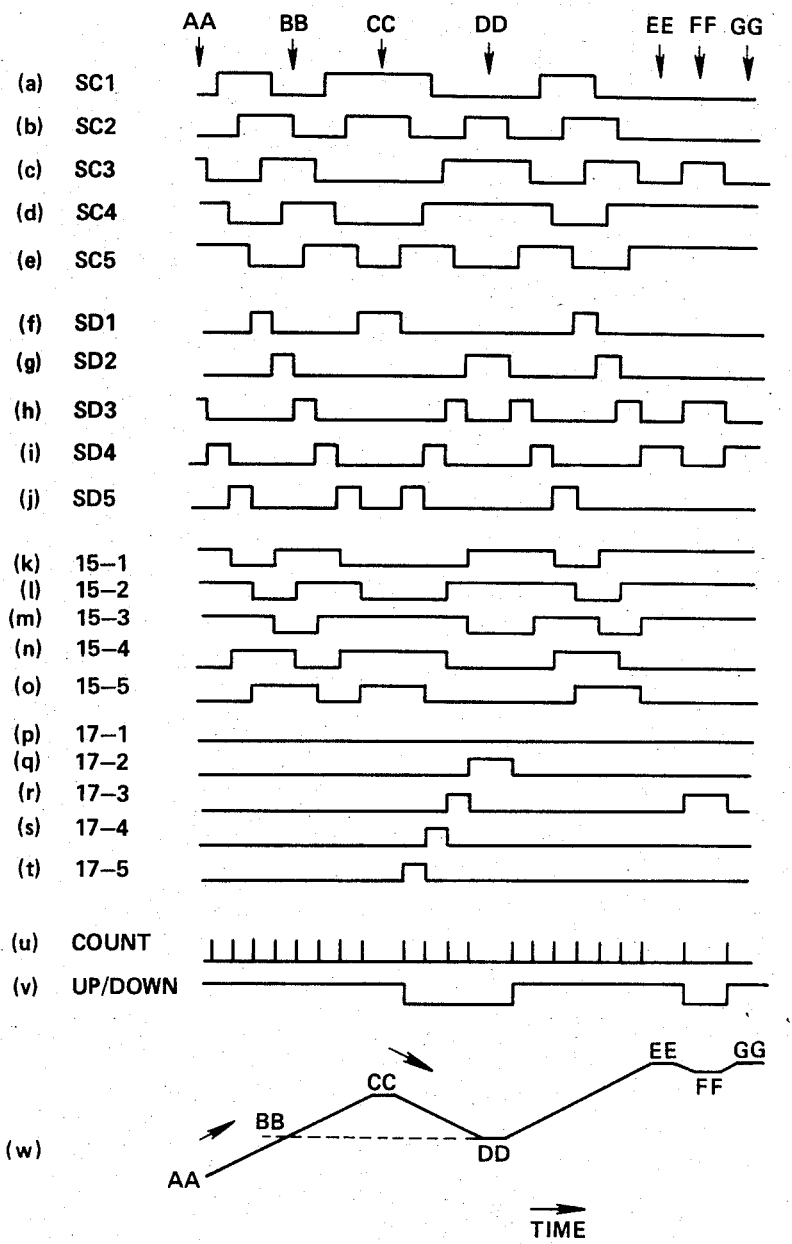
FIG. 3 is a waveform chart similar to FIG. 2 but showing waveforms obtained when the direction of movement of an object is changed.

FIG. 3 shows waveforms of various signals appearing in the system of FIG. 1 when the rotational direction of the rotary slit disc 43 is changed arbitrarily. In the example of FIG. 3, the rotational direction of the rotary disc 43 is changed as shown at (w) in FIG. 3. Accordingly, the input signals SC1 to SC5 alternate between the two states as shown at (a) to (e) of FIG. 3, respectively. The input signals SC1 to SC5 having the waveforms shown in FIG. 3 cause the position sensing system of the first embodiment to produce waveforms of the component position signals SD1 to SD5 shown at (f) to (j), waveforms of the output signals of the flip-flops 15-1 to 15-5 shown at (k) to (o), waveforms of the output signals of the AND gates 17-1 to 17-5 shown at (p) to (t), waveforms of the COUNT signal and the UP/DOWN signal shown at (u) and (v).

From a point AA through a point BB to a point CC on the line shown at (w) of FIG. 3, the rotary disc rotates in the clockwise direction unidirectionally. During this, the UP/DOWN signal is held at the "1" state as shown by the waveform (v), and therefore the pulses of the COUNT signal shown at (u) are counted in the up-count mode to increase the count. At the point CC, the rotational direction of the rotary disc is changed to the counterclockwise direction, and the rotary disc continues rotating in the counterclockwise direction until a point DD is reached. Between the points CC and DD, the UP/DOWN signal remains "0" as shown at (v), and therefore the pulses of the COUNT signal (u) are counted in the down-count mode. In the rotational movement from BB through CC to DD, the initial and final angular positions of the rotary disc are essentially identical with each other as shown by a horizontal broken line at (w) in FIG. 3. During this movement, the position sensing system of the first embodiment increases the count by four and then decreases the count by four, so that this system can indicate the position correctly by making the count at the point DD equal to the count at the point BB. Even when the rotational movement of the rotary disc is oscillatory as in a course of EE, FF and GG, the position sensing system of the first embodiment is free from error. During the counterclockwise rotation between the points EE and FF, the count is decreased by one. During the clockwise rotation between the points FF and GG, the count is increased by one.

The position sensing system of the first embodiment can respond to a change in the position of an object accurately without regard to manner of change of the rotational direction because the UP/DOWN signal is adjusted at the instant at which each pulse of the COUNT signal is produced.

Figure 4:
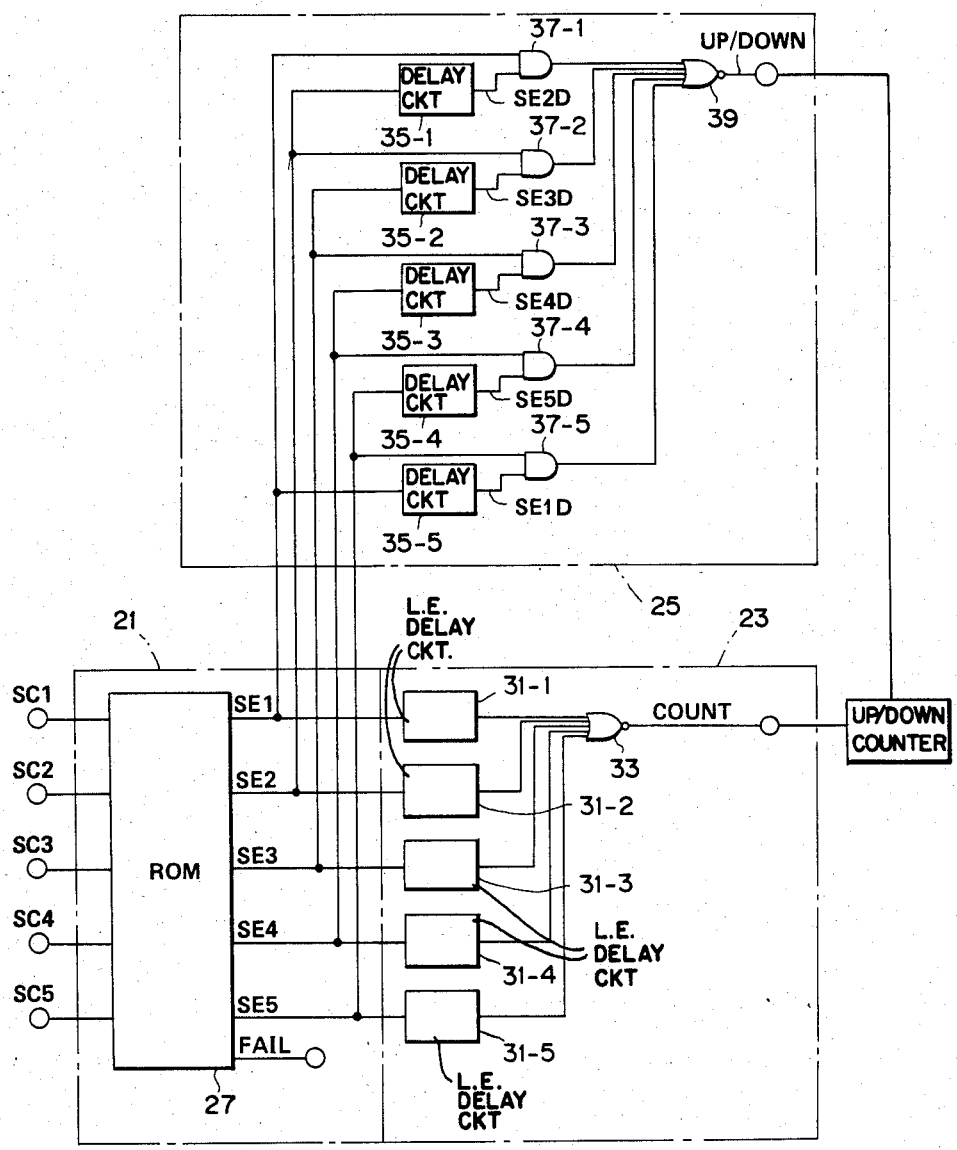
FIG. 4 is a diagram of a second embodiment of the present invention.

A second embodiment of the present invention is shown in FIG. 4. Like the first embodiment, a position sensing system of the second embodiment comprises a minute position sensing circuit 21, a count signal generating circuit 23 and a direction determining circuit 25.

The minute position sensing circuit 21 of the second embodiment has a read-only memory (ROM) 27 which receives the input signals SC1 to SC5 as an address signal for designating a memory location, and delivers component position signals SE1 to SE5 as a data output signal. The count signal generating circuit 23 has leading-edge delay circuits 31-1 to 31-5 and a five-input NOR gate 33. The leading-edge delay circuits 31-1 to 31-5 receive the component position signals SE1 to SE5, respectively. Each of the leading-edge delay circuits retards each leading edge of the inputted component position signal by an amount of time TD1. The NOR gate 33 produces the COUNT signal by inverting the logical sum of the outputs of the five leading-edge delay circuits 31-1 to 31-5.

The direction determining circuit 25 has delay circuits 35-1 to 35-5, two-input AND gates 37-1 to 37-5 and a five-input NOR gate 39. The delay circuits 35-1 to 35-5 receive the component position signals SE2, SE3, SE4, SE5 and SE1, respectively. Each of the delay circuits 35-1 to 35-5 retards the phase of the associated component position signal by TD2 (TD2>TD1). Each of the AND gates 37-1 to 37-5 has a first input terminal receiving a corresponding one of the component position signals SE1 to SE5 directly, and a second input terminal receiving the neighboring component position signal which is adjacent, in the phase sequence, to the corresponding component position signal inputted to the first input terminal, through one of the delay circuits 35-1 to 35-5. Each of the AND gates 37-1 to 37-5 performs a logical multiplication between the two inputs. The NOR gate 39 produces the UP/DOWN signal by inverting the logical sum of the outputs of the five AND gates 37-1 to 37-5.

Figure 5:
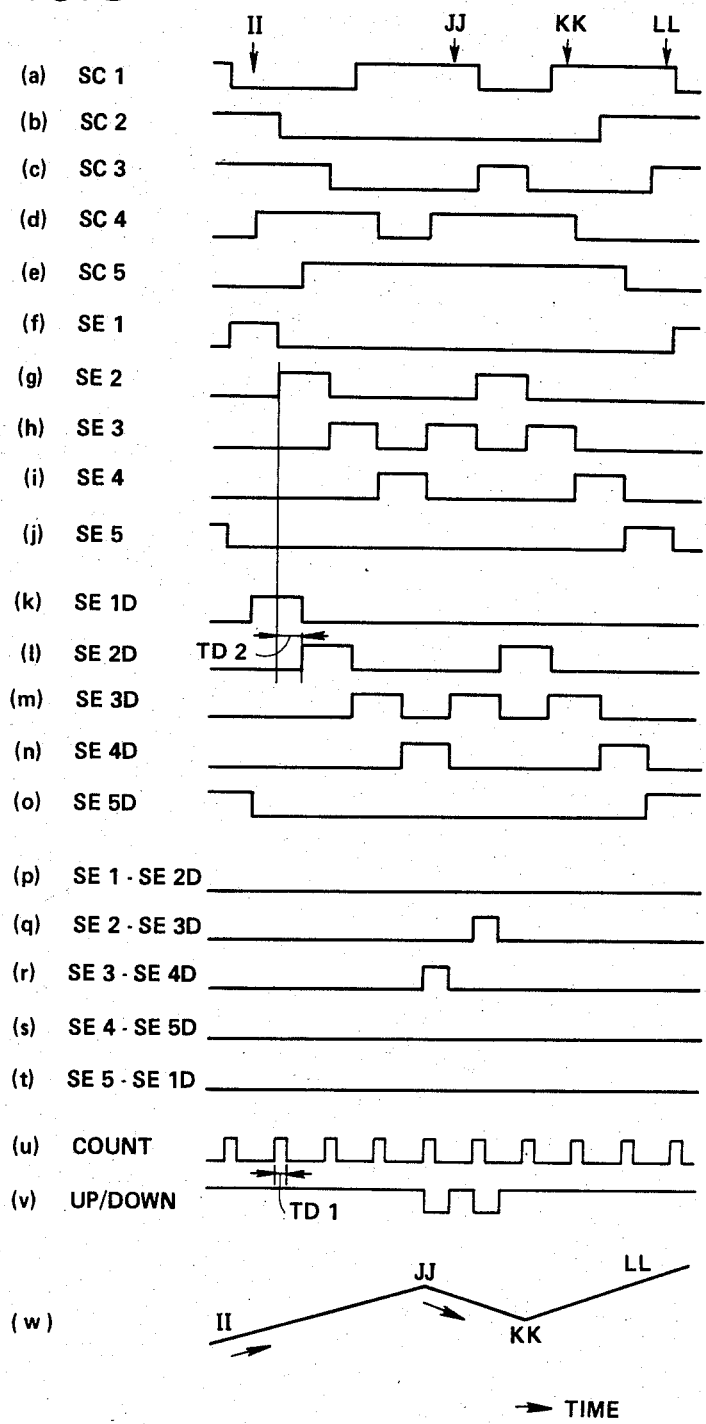
FIG. 5 is a waveform chart of signals appearing in the system of FIG. 4.

The position sensing system of the second embodiment is operated as follows:

FIG. 5 shows waveforms of the signals appearing in the system of the second embodiment shown in FIG. 4 when the rotational direction of the rotary disc 43 is changed arbitrarily as shown at (w). The waveforms of the input signals SC1 to SC5 obtained in this case are shown at (a) to (e).

In the minute position sensing circuit 21, the signals SC1 to SC5 are inputted to the ROM 27 as address inputs. The ROM 27 contains such a pattern of data that the ith component position signal SEi is "1" if the ith input signal SCi is "0" and the (i+1)st input signal SCi+1 is "1". Because of the properties of the input signal SC1 to SC5, only one of the component position signals SE1 to SE5 (as shown at (f) to (j) in FIG. 5) can be "1" at a time. For example, at an instant II in FIG. 5, the input signal SC1 is "0" (as shown at (a) in FIG. 5), and the input signal SC2 is "1" (cf.(b) of FIG. 5). Therefore, SE1=1, SE2=0, SE3=0, SE4=0 and SE5=0.

It is optional to arrange the ROM 27 to have an additional data output FAIL. If all of the input signals SC1 to SC5 are "0", or if all are "1", then the ROM 27 delivers the FALL signal to indicate the presence of an abnormal condition in the component parts for producing the input signals.

In the count signal generating circuit 23, the component position signal SE1 to SE5 are inputted, respectively, to the leading-edge delay circuits 31-1 to 31-5, each of which retards each leading edge of its input signal SE1, SE2, ... or SE5 by TD1. The five-input NOR gate 33 produces the COUNT signal (cf.(u) of FIG. 5) by inverting the logical sum of the outputs of the five leading-edge delay circuits 31-1, ... and 31-5. That is, at each instant at which any one of the component position signals SE1, ... and SE5 rises from "0" to "1", a pulse having a pulse duration (pulse width) equal to TD1 is produced. The thus-produced pulse train is outputted as the COUNT signal.

In the direction determining circuit 25, the delay circuits 35-1, ... and 35-5 receive the component position signals SE2, SE3, SE4, SE5 and SE1, respectively, and provide five delayed signals SE2D, SE3D, SE4D, SE5D and SE1D, as shown at (k), ... and (o) in FIG. 5), respectively. Each of the AND gates 37-1, ... and 37-5 receives a succesive pair consisting of preceeding and succeeding ones, which are selected from the component position signals SE1, ... and SE5. The succeeding component position signal of each pair is next to the proceeding component position signal of the same pair in the phase sequence. The proceeding signal is inputted to the associated AND gate 37-1, ... or 37-5 directly while on the other hand the succeeding signal is inputted to the AND gate through one of the delay circuits 35-1, ... or 35-5 in the form of the delayed signal SE1D, ... or SE5D. Each of the AND gates 37-1, ... and 37-5 performs the logical multiplication between the proceeding component position signal and the delayed signal corresponding to the succeeding component position signal, and provides a logical product signal SE1·SE2D, SE2·SE3D, SE3·SE4D, SE4·SE5D or SE5·SE1D as shown at (p), ... and (t). The NOR gate 39 produces the UP/DOWN signal (cf. (v) of FIG. 5) by inverting the logical sum of the five logical product signals SE1·SE2D, ... and SE5·SE1D. When the rotary disc 43 rotates in the clockwise direction and its rotation angle varies from II to JJ as shown at (w) of FIG. 5, the component position signals SE1, ... and SE5 reach the "1" state in the sequence SE1, SE2, SE3. In this case, all of the logical product signals (p) to (t) produced by the AND gates 37-1, ... and 37-5 are "0", and the UP/DOWN signal remains "1". Therefore, the pulses of the COUNT signal are counted in the up-count mode to increase the count. When the rotary disc 43 rotates in the counterclockwise direction and its angular displacement varies from JJ to KK as shown at (w) in FIG. 5, the component position signals SE1, ... and SE5 reach the "1" state in the reverse sequence SE3, SE2, SE1. In this case, the logical product signals outputted by the AND gates 37-1, ... and 37-5 become "1" one after another as shown at (r) and (q) in FIG. 5. Consequently, the UP/DOWN signal changes to the "0" state at each instant when a pulse of the COUNT signal is produced. In this way, the position sensing system of the second embodiment can detect the position of the object accurately even when the object moves back and forth rapidly.

What is claimed is:

1. A position sensing system comprising:
    position signal generating means for producing a series of component position signals each of which varies periodically in accordance with displacement of an object in such a manner that said component signals differ in phase successively by a predetermined phase difference in a predetermined forward sequence of said component signals when the object moves in a forward direction and in a reverse sequence opposite to said forward sequence when the object moves in a reverse direction opposite to said forward direction;
    counting means for determining the position of the object by counting occurences of a predetermined change which recurs periodically in each of said component signals, said counting means having a positive mode for increasing a count by a predetermined number for each occurrence of said predetermined change and a negative mode for decreasing the count by the predetermined number for each occurrence of said change; and
    direction determining means for determining, upon each occurrence of said change of said component position signals, whether said change occurs in the forward sequence or in the reverse sequence, and switching said counting means between said positive and negative modes in dependence on the result of the determination of the sequence, said direction determining means comprising a set of direction determining component units each of which receives at least a first input signal which is uniquely one of said component position signals and a second input signal which is said component position signal that is next in one of said forward and reverse sequences to said first input signal, each of said component units responding to each occurrence of said change in said first input signal in a predetermined manner only if said change occurs in said second input signal immediately before the current occurrence.

2. A system according to claim 1 wherein said component position signals are such two-valued signals that a one state exists at any time only in any one of said component position signals, and wherein each of said component units of said direction determining means comprises a first element for receiving said first input signal and a second element for receiving said second input signal and producing a two-valued third signal which rises from its zero state to its one state each time said second input signal rises from its zero state to its one state, and remains in the one state even after said second input signal falls to the zero state, said first element of each unit being a two-input AND gate receiving said third signal in addition to said first input signal.

3. A system according to claim 2 wherein said direction determining means further comprises a logic element for receiving output signals of said AND gates and producing an UP/DOWN signal to switch said counting means.

4. A system according to claim 3 wherein said logic element of said direction determining means is a NOR gate.

5. A system according to claim 4 wherein said position signal generating means comprises a shutter plate having a plurality of slits, and a plurality of photocouplers.

6. A system according to claim 5 wherein said position signal generating means produces a series of pulse signals from output signals of said photocouplers, each of said pulse signals rising and falling periodically with movement of said shutter plate in such a manner that said pulse signals differ in phase succesively in a predetermined sequence by a fraction of a cycle, a numerator of said fraction being equal to one and a denominator of said fraction being equal to the number of said pulse signals, there being a one-to-one correspondence between said pulse signals and said component position signals, each of said component position signals being in the one state when a corresponding one of said pulse signals is in the zero state, and at the same time said pulse signal which is next to the corresponding one is in the one state.

7. A system according to claim 6 wherein said counting means comprises count pulse generating means for producing a count pulse each time any one of said component position signal rises from the zero state to the one state, and an up/down counter for counting said count pulses in said positive and negative mode.

8. A system according to claim 7 wherein said shutter plate is adapted to rotate together with the object for sensing the angular position of the object.

9. A system according to claim 8 wherein said second element of each unit of said direction determining means is an RS flip-flop having an S input terminal receiving said second input signal and an R input terminal receiving said component position signal which is adjacent to said first input signal in one of said forward and reverse sequences and other than said second input signal.

10. A system according to claim 9 wherein said position signal generating means comprises a set of AND gates each of which receives uniquely one of succesive pairs of said pulse signals, one directly and the other through a NOT gate.

11. A system according to claim 10 wherein said count pulse generating means comprises a set of pulse oscillators for receiving uniquely one of said component position signals, and an OR gate receiving outputs of said pulse oscillators.

12. A system according to claim 8 wherein said second element of each unit of said direction determining means is a dely circuit for retarding said second input signal by a predetermined delay.

13. A system according to claim 12 wherein said position signal generating means comprises a read-only memory receiving said pulse signals as address inputs and providing said component position signals as data outputs.

14. A system according to claim 13 wherein said counting means comprises a set of leading-edge delay means each of which receives uniquely one of said component position signals and produces an output pulse whose leading edge is retarded by a predetermined delay shorter than the delay of said delay circuits of said direction determining means with respect to the leading edge of an input pulse of said component position signal, and a NOR gate receiving said output pulses of said leading-edge delay means.

* * * * *